United States Patent [19]

Knäbel

[11] Patent Number: 4,934,062
[45] Date of Patent: Jun. 19, 1990

[54] APPARATUS FOR CHECKING THE AXIAL DIMENSIONS OF WORKPIECES

[75] Inventor: Horst Knäbel, Meerbusch, Fed. Rep. of Germany

[73] Assignee: Rheinmetall GmbH, Düsseldorf, Fed. Rep. of Germany

[21] Appl. No.: 323,932

[22] Filed: Mar. 15, 1989

[30] Foreign Application Priority Data

Mar. 15, 1988 [DE] Fed. Rep. of Germany ....... 3808551

[51] Int. Cl.⁵ .............................................. G01B 7/28
[52] U.S. Cl. ........................................ 33/572; 33/573; 33/557; 33/548; 33/549
[58] Field of Search ................. 33/573, 572, 561, 560, 33/559, 548, 549, 558, 557, 832, 552, 557, 558

[56] References Cited

U.S. PATENT DOCUMENTS 3,000,101 9/1961 Giardino et al. .................... 33/558
3,102,344 9/1963 Herman .............................. 33/573

Primary Examiner—Harry N. Haroian
Attorney, Agent, or Firm—Spencer & Frank

[57] ABSTRACT

An apparatus for checking the overall lengths of workpieces or the lengths of portions of workpieces, particularly shafts or the like, includes a base in the form of a profiled rod (12). The base has two clamping faces (18, 20) which are oriented at a right angle (22) to one another and to the workpiece (14) to be checked. The base has T-shaped grooves (24, 26) which open onto the clamping faces (18, 20). Each of the clamping faces (18, 20) is provided with a respective clamping strip (30, 32) which is guided longitudinally in the respective T-groove (24, 26) by a respective protrusion (29) and which can be fixed by screws (31) in any desired position on the respective clamping face (18, 20). The clamping strips (30, 32) can be equipped with measuring devices (34), for example measuring sensors, and/or with supporting elements (36). The workpiece (14) may also be clamped into spindle sleeve mounts (46) which are mounted via the T-grooves (24, 26).

11 Claims, 2 Drawing Sheets

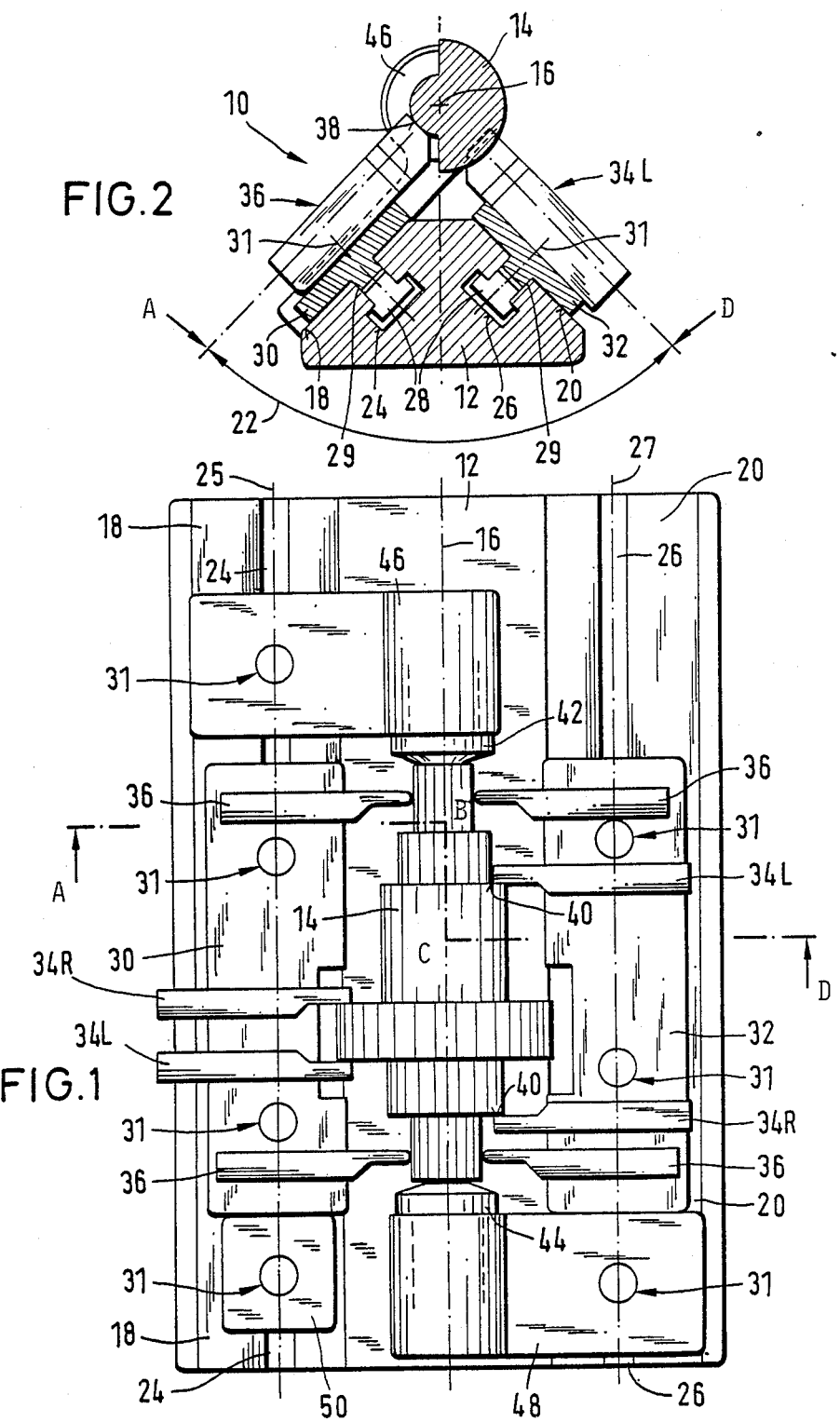

APPARATUS FOR CHECKING THE AXIAL DIMENSIONS OF WORKPIECES

CROSS REFERENCE TO RELATED APPLICATION

This application claims the priority of application Ser. No. P 38 08 511.8, filed Mar. 15, 1988 in the Federal Republic of Germany, the subject matter of which is incorporated herein by reference.

BACKGROUND OF THE INVENTION

The present invention relates to an apparatus for checking axial dimensions, such as the overall length of a workpiece or the length of a portion of a workpiece, particularly of shafts, axles, hubs, and the like. More particularly, the invention is directed to an axial dimension checking apparatus of the type which includes a base element and structures for accommodating measuring devices and workpieces which are to be checked.

To check axial dimensions on workpieces, such as shafts, axles, hubs, and the like, apparatuses are known in which a base element is configured as a base plate or base frame onto which the measuring devices are mounted. The measuring devices mounted on the base element may include guide elements or a guide rod and length measurement sensors with offset sensor tips.

Depending on the number of axial measurements to be checked, the required axial orientation of such measuring devices and their often-considerable structural lengths makes it necessary to arrange several measuring devices next to one another.

Since, however, the number of measuring devices that can be combined and assembled in this way is limited, a suitable sensor tip must be selected or adapted, depending on the spacing of the individual measuring devices, to the face or surface of the workpiece which it is to check. A particular drawback of such apparatuses is the bridging of the spaces between the measuring devices and the faces to be checked if the workpiece to be measured exhibits considerable, sudden changes in diameter, as is frequently the case with drive shafts. Since customarily the positions in which the measuring devices are arranged in the assembly depend on the largest diameter of the workpiece, the sensor tips must therefore be able to extend to the portions where the smallest diameters start.

To accommodate and hold the workpieces to be measured, such apparatuses are often equipped with guide strips on which spindle sleeve mounts or props are assembled which, however, are completely independent of the configuration of the measuring devices.

SUMMARY OF THE INVENTION

It is therefore an object of the present invention to provide an apparatus for checking axial measurements such as the overall length of a workpiece or the length of a portion of a workpiece, particularly shafts, axles, hubs, and the like, in a manner which avoids the drawbacks of the prior art apparatuses and which permits measurements to be taken at a far greater number of measuring locations. The apparatus is to be very quickly changeable to accommodate different workpieces and should also be suitable to receive, hold, fix, and possibly also clamp in the workpiece to be checked, yet the apparatus should be compact, easily manipulated, and economical.

This is accomplished according to the present invention by an axial dimension checking apparatus which is characterized in that the base of the apparatus is configured as a profiled bar having an essentially trapezoidal cross section whose trapezoidal faces form two clamping faces disposed at an angle relative to one another, with a T-shaped groove being provided in each one of said clamping faces parallel to a workpiece axis so that said clamping faces can be equipped with clamping strips for the attachment of measuring devices and with structures for holding the workpiece, with the two measuring planes formed by said measuring devices intersecting in the workpiece center line.

A particular advantage of an apparatus according to the invention is that its base element is configured as a profiled bar having a trapezoidal cross section whose trapezoidal faces are provided, at a given distance from the axis of the workpiece to be checked, with two symmetrically arranged clamping faces which preferably form a right angle and which have T-shaped grooves parallel to the workpiece axis. These clamping faces can be equipped with clamping strips so as to accommodate measuring and supporting devices and with structures for holding, fixing, or clamping in the workpiece. Protrusions provided at the clamping strips and at the structures for holding the workpiece permit the clamping strips and holding structures to be guided in the T-shaped grooves of the profiled bar and to be axially displaced. The clamping strips and holding structures may be fixed at any location on the profiled bar, preferably at predetermined fixed stops, by means of screws or inserted T-shaped tenon blocks, so that the axial dimension checking apparatus can be employed in a simple manner for different workpieces that must be checked.

Moreover, an apparatus according to the invention offers the advantageous possibility of a very high measuring location density since a large number of measuring devices can be arranged selectively or alternatingly on the two clamping faces of the profiled bar. The clamping faces are preferably disposed at a right angle to one another. Depending on the measuring task at hand and the configuration of the workpiece, the measuring devices may sense to the right or to the left.

Another advantage in the device according to the invention is that elements to support the workpiece can be mounted onto the clamping strips, so that the workpiece is mounted in a very simple and effective manner.

Additionally, the profiled bar of the apparatus makes it the T-shaped grooves and are fixed by way of T-shaped tenon blocks. These mounts, in turn, can be equipped with inserts for holding, fixing, or clamping in the workpiece or workpieces. Due to the symmetrical arrangement of the clamping faces of the profiled bar relative to one another, it is advantageously possible to employ spindle sleeve mounts of a uniform type and to use them selectively to the left or right of the workpiece in the corresponding T-shaped grooves, with the axes of the spindle sleeves in the clamped state being flush with the center line of the workpiece.

BRIEF DESCRIPTION OF THE DRAWINGS

FIG. 1 is a top plan view of an apparatus according to the invention, and shows the apparatus in use with measuring devices to check axial dimensions of a workpiece.

FIG. 2 is a sectional view of the apparatus of FIG. 1, the section being taken along the path marked A-B-C-D in FIG. 1.

DESCRIPTION OF THE PREFERRED EMBODIMENT

Figure 3:
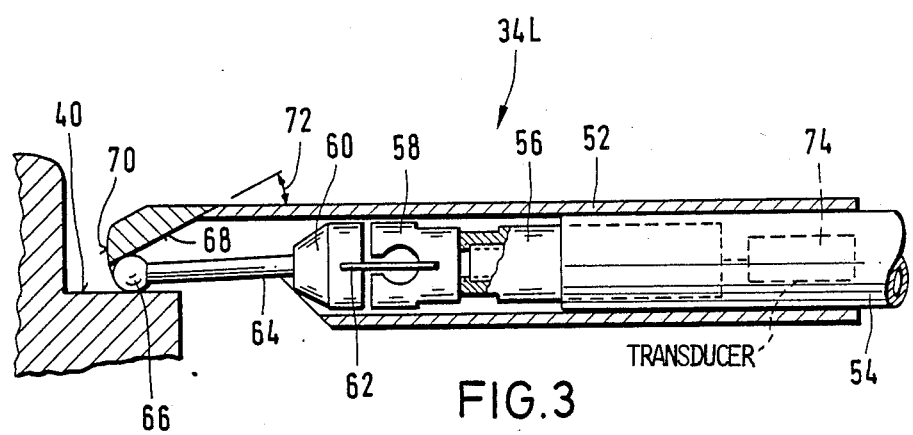
FIG. 3 is a longitudinal sectional view of a measuring device shown in FIG. 1.

In FIGS. 1 and 2, an apparatus 10 according to the invention for checking the axial dimensions of a workpiece, here, for example, a shaft 14 having a workpiece axis 16, includes a profiled bar 12 of any desired length. The term "profiled" as used herein means that bar 12 has a specially shaped periphery when seen in cross section. Bar 12 has a first clamping surface or face 18 and a second clamping face 20 which, in the illustrated embodiment, extend below workpiece axis 16 and in the direction of axis 16. First clamping face 18 and second clamping face 20 are disposed at an angle 22, preferably a right angle. A first T-shaped groove 24 is cut into first clamping face 18, with the longitudinal axis 25 (see FIG. 2) of the groove being disposed parallel to workpiece axis 16. A second T-shaped groove 26 is cut into second clamping face 20, and its longitudinal axis 27 also extends parallel to workpiece axis 16.

A plurality of T-shaped tenon blocks 28 are disposed in grooves 24 and 26 for fixing a first clamping strip 30 on the first clamping face 18 and a second clamping strip 32 on the second clamping face 20 by means of screws 31. Protrusions 29 are machined on clamping strips 30 and 32, or are additionally attached to them, to guide clamping strips 30 and 32 in grooves 24 and 26 along their respective longitudinal axes 25 and 27.

FIG. 1 shows two alternatives for supporting shaft 14 above bar 12 while the axial dimensions of shaft 14 are being checked. In one of these alternatives, supporting elements 36 are detachably mounted on clamping strips 30 and 32 by way of clamping members (not illustrated). The supporting elements 36 have rounded contact noses 38 (see FIG. 1) on which the shaft 14 is placed. However, without limiting the scope of the invention, it is also possible to employ supporting elements whose noses support the workpiece by means of one or more rotatable discs (not shown) which are rounded off at their edges. To prevent axial movement of shaft 14 when it is held up by supporting elements 36, stops (not illustrated) can be fastened in grooves 24 and 26 in a manner similar to clamping strips 30 and 32. Such stops are positioned to provide abutment surfaces for lateral steps or faces (e.g., faces 40) of the workpiece.

Another alternative for holding the shaft 14 to be checked is to center it between a first centering mandrel 42 and a second centering mandrel 44, and to clamp it in and hold it. A first spindle sleeve mount 46 is associated with the first centering mandrel 42 and a second spindle sleeve mount 48 is associated with the second centering mandrel 44. Spindle sleeve mounts 46 and 48 are preferably composed essentially of sleeves to accommodate centering mandrels 42 and 44 as well as strip-like plates which are connected to the sleeves. The plates are provided with protrusions 29 in the same manner as clamping strips 30 and 32. Mounts 46 and 48 can be fixed in grooves 24 and 26 by means of T-shaped tenon blocks 28 and screws 31. Since mounts 46 and 48 are preferably identical in construction, they can be employed in first groove 24 as well as in second groove 26. In the clamped state, centering mandrels 42 and 44 and spindle sleeve mounts 46 and 48 are aligned with workpiece axis 16.

Preferably, one of the spindle sleeve mounts may serve, as shown in FIG. 2 for spindle sleeve mount 48, as an abutment member for a clamping strip, in this case the second clamping strip 32. For the other clamping strip which does not abut against a spindle sleeve mount, here the first clamping strip 30, an additional abutment member 50 is provided. Abutment member 50 is mounted, in the same manner as clamping strips 30 and 32 and spindle sleeve mounts 46 and 48, by way of a protrusion 29 in the respective groove 24 or 26 and is fixed by means of a T-shaped tenon block 28.

Although both alternatives for supporting a workpiece such as shaft 14 are shown in FIG. 2, this has been done only to facilitate the description and it will be understood that ordinarily they would not be employed simultaneously. To equip or retrofit apparatus 10 for checking any desired workpiece, the type of workpiece support is first selected. As has been described, this may be effected either by way of centering mandrels 42 and 44 or by way of supporting elements 36 which are arranged to form props. Spindle sleeve mounts 46 and 48 are suitable to accommodate fixable or adjustable centering mandrels and centering tips or also clamping members, as provided for the above-described centering mandrels 42 and 44. If the workpiece is to be mounted by way of props, clamping strips 30 and 32 are equipped with supporting elements 36 at the locations intended for this purpose.

With continuing reference to FIGS. 1 and 2, measuring devices 34 are detachably mounted on clamping strips 30 and 32 by way of clamping members (not illustrated). The measuring devices 34 that are clamped to strip 30 are disposed in a measuring plane which is parallel clamping face 18 and similarly, the measuring devices 34 that are clamped to strip 32 are disposed in a measuring plane which is parallel to clamping face 20. These measuring planes intersect at workpiece axis 16. Measuring devices 34 sense either to the right or to the left, and for this reason are identified in the drawings with reference numbers 34R (right) and 34L (left). Right-sensing and left-sensing measuring devices 34 are employed in pairs to determine the distance between two lateral steps or faces, such as faces 40 in FIG. 2. Suitable measuring devices 34 are described in the Applicant's co-pending application, Ser. No. 07/323,933 filed concurrently herewith. The disclosure of this co-pending application is incorporated herein by reference. However, a measuring device as disclosed in the co-pending application will now be briefly described with reference to FIG. 3.

In FIG. 3, a measuring device 34L includes a hollow housing 52 having a rectangular cross section to facilitate the mounting of the measuring device on a clamping strip (for example, clamping strip 32 in FIG. 2). A compressed air conduit 54 is attached to housing 52. The attachment is preferably accomplished in a manner such that the relative position of conduit 54 within housing 52 can be adjusted. Although not illustrated, this can be accomplished using set screws or using a tightening member along with a nut and a bolt. A piston 56 slides telescopically in conduit 54, and a coupling member 58 is screwed into piston 56. Sensor head 60 is connected to member 58 via a leaf spring 62. Sensor head 60 includes a rigid shaft 64 which terminates in a movable contact member such a ball 66. An internal deflecting surface 68 is provided at nose end 70 of housing 52.

Piston 56 is normally retained within conduit 54 by a spring (not illustrated). However, when conduit 54 is charged with pressurized air, piston 56 is extended as illustrated until ball 66 is wedged between deflecting surface 68 and workpiece face 40. Deflecting surface 68 is disposed at an angle 72 with respect to the axis of housing 52 (which is parallel to the housing surface shown in the drawing). Angle 72 is preferably 26° 33', 54" since the tangent of this angle is 0.5. As a result, after ball 66 contacts surface 68, every further advance of ball 66 by 2 microns in the radial direction will cause ball 66 to be deflected by one micron toward workpiece face 40 of the shaft. Accordingly, after ball 66 has been wedged between surface 68 and workpiece face 40, the signal produced by a linear position transducer 74 is a function of the axial position of face 40. After the position of face 40 has been sensed in this manner, the pressure in conduit 54 is relieved and the spring (not illustrated) withdraws piston 5 in preparation for the next measurement operation on a new workpiece.

Although FIG. 3 illustrates a left-sensing measuring device 34L, the construction of a right-sensing device 34R is similar, with the deflecting surface 68 being oriented in the opposite direction. In either type of measuring device 34, the sensing movement of the contact member (that is, ball 66) is parallel to the workpiece axis 16 (see FIG. 1). Furthermore, if the noses 70 of the measuring devices 34 are configured as illustrated in FIG. 3, measuring devices 34 can be used in lieu of support elements 36 (see FIG. 1) to mechanically support a workpiece during measurements.

Returning to FIGS. 1 and 2, the set-up of apparatus 10 in preparation for checking the axial dimensions of a new type of workpiece will now be described. It will be assumed that the new workpieces will be supported by centering mandrels 42 and 44 rather than by supporting elements 36. After the lengths (that is, distances between transverse faces such as faces 40) of the new type of workpiece to be checked have been determined, measuring devices 34L and 34R are mounted onto clamping strips 30 and 32 at appropriate locations. Clamping strips 30 and 32 are then brought into abutment with spindle sleeve mount 48 (for example) and abutment member 50, which are preferably both disposed on the same side of the clamping strips 30 and 32. The clamping strips 30 and 32 are then tightly affixed to bar 12.

The minimum distance between clamping faces 18 and 20 of profiled bar 12 and workpiece axis 16 is determined by the distance between clamping faces 18 and 20 and the measuring plane of measuring devices 34 as well as by the thickness of clamping strips 30 and 32.

Depending on the workpiece and the measuring job to be performed, it is also possible to use alternative measuring devices (not illustrated) which are effective at a right angle on a workpiece surface extending parallel to the workpiece axis 16, the alternative measuring devices being mounted on clamping strips 30 and 32 along with the illustrated measuring devices 34. This is particularly appropriate if the workpiece, for example a shaft, is moved about its axis of rotation during the measurement. It is advantageous to configure clamping strips 30 and 32 in such a manner that they are adapted to one or more workpiece outlines so that, when a change is made to another workpiece or another type of workpiece, it is easy to exchange the clamping strips. It is left to the user's discretion to exchange the clamping strips with or without the removable measuring devices.

It will be understood that the above description of the present invention is susceptible to various modifications, changes, and adaptations, and the same are intended to be comprehended within the meaning and range of equivalents of the appended claims.

What I claim is:

1. An apparatus for use with measuring devices to check the axial dimensions of a workpiece having an axis, comprising:
    an elongated base having a surface with first and second spaced apart clamping faces which are disposed at a predetermined angle relative to one another, the base additionally having a first generally T-shaped groove which opens onto the first clamping face and a second generally T-shaped groove which opens onto the second clamping face, the first groove having a first axis and the second groove having a second axis which is generally parallel to the first axis;
    a first clamping strip to support at least one measuring device in a first measuring plane;
    a second clamping strip to support at least one further measuring device in a second measuring plane;
    holding means for supporting the workpiece over the base so that the axis of the workpiece is substantially parallel to the first and second axes;
    first mounting means for mounting the first clamping strip on the first clamping face so that the first measuring plane intersects the workpiece; and
    second mounting means for mounting the second clamping strip on the second clamping face so that the second measuring plane intersects the workpiece and the first measuring plane.

2. The apparatus of claim 1, wherein the first mounting means comprises a protrusion extending from the first clamping strip into the first groove, and generally T-shaped tenon blocks associated with the protrusion to fix the first clamping strip, and wherein the second mounting means comprises a protrusion extending from the second clamping strip into the second groove, and generally T-shaped tenon blocks associated with the protrusion extending from the second clamping strip to fix the second clamping strip.

3. The apparatus of claim 1, wherein the holding means comprises a member having a protrusion which extends into one of the first and second grooves, and a generally T-shaped tenon block associated with the protrusion to fix the member.

4. The apparatus of claim 1, wherein the grooves in the base are disposed symmetrically to the axis of the workpiece so that the clamping strips and holding means can be exchanged as well as assembled on the clamping faces.

5. The apparatus of claim 1, wherein each measuring device has a longitudinal axis and a contact member which moves transverse to the longitudinal axis, and wherein the measuring devices are supported by the clamping strips so that the axes of the measuring devices are substantially perpendicular to the axis of the workpiece.

6. The apparatus of claim 1, wherein the holding means comprises supporting elements mounted on the clamping strips, the supporting elements having noses on which the workpiece is supported.

7. The apparatus of claim 6, wherein the noses of the supporting elements are rounded.

8. The apparatus of claim 1, wherein the predetermined angle between the first and second clamping faces is substantially a right angle.

9. The apparatus of claim 1, wherein the base is configured as a profiled bar having an essentially trapezoidal cross section, the first and second clamping faces lying on respective sides of the trapezoid.

10. The apparatus of claim 1, wherein the first and second measuring planes intersect substantially at the axis of the workpiece.

11. The apparatus of claim 1, wherein the holding means comprises a pair of centering mandrels, and means contacting at least one of the first and second clamping faces for mounting the mandrels at spaced apart positions over the base.

* * * * *